United States Patent Office 3,712,935
Patented Jan. 23, 1973

3,712,935
PHENOXAPHOSPHINIC ACID DERIVATIVES
Stanley J. Strycker, Midland, Mich., assignor to The Dow Chemical Company, Midland, Mich.
No Drawing. Original application Oct. 3, 1968, Ser. No. 764,913, now Patent No. 3,576,863, dated Apr. 27, 1971. Divided and this application May 25, 1970, Ser. No. 48,694
Int. Cl. C07d 105/04
U.S. Cl. 260—936                     3 Claims

ABSTRACT OF THE DISCLOSURE

Phenoxaphosphinic acid derivatives corresponding to the formula

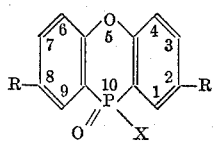

wherein R represents chloro, bromo, lower alkyl or lower alkoxy and X represents lower alkoxy, or phenylthio. The compounds are useful as pesticides for the control of plant pests.

---

This application is a division of U.S. Pat. 3,576,863, filed Oct. 3, 1968.

SUMMARY OF THE INVENTION

The present invention concerns a group of new phenoxaphosphinic acid derivaties corresponding to the formula

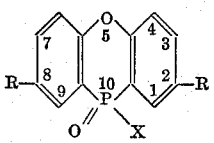

In this and succeeding formulas, R represents chloro, bromo, lower alkyl or lower alkoxy and X represents lower alkoxy, or phenylthio (—SC$_6$H$_5$). In the present specification and claims, lower alkyl and lower alkoxy represent moieties containing from 1, to 2, to 3, to 4 carbon atoms, such as methyl, ethyl, propyl, butyl, methoxy, ethoxy, propoxy and butoxy. The new compounds are high melting solids. They have low solubilities in water and a somewhat higher solubility in common organic solvents such as acetone, chloroform and benzene. The new compounds are useful as pesticides for the control of plants including bacteria and fungi.

Representative phenoxaphosphinic acid derivatives of this invention include 2,8-di-n-butyl-10-n-butoxyphenoxaphosphine 10-oxide,
2,8-dimethoxy-10-methoxyphenoxaphosphine 10-oxide,
2,8-di-n-butoxy-10-butoxyphenoxaphosphine 10-oxide,
2,8-dichloro-10-n-propoxyphenoxaphosphine 10-oxide,
2,8-di-n-butyl-10-(phenylthio)phenoxaphosphine 10-oxide,
2,8-diethoxy-10-(phenylthio)phenoxaphosphine 10-oxide and
2,8-di-n-butoxy-10-(phenylthio)phenoxaphosphine 10-oxide.

The new phenoxaphosphinic acid derivatives are prepared by reacting a 2,8-disubstituted phenoxaphosphinyl chloride with HX when HX is a lower alkanol, or phenylthiol according to the following mechanism:

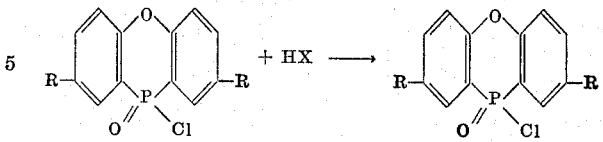

The reaction is conveniently carried out in an inert organic solvent as reaction medium, such as benzene, toluene, xylene, methylene chloride, tetrahydrofuran, ether, dioxane, 1,2-dimethoxyethane or mixtures thereof or in the presence of excess lower alkanol as reaction medium when a 10-alkoxy substitution corresponding to the lower alkanol alkoxy moiety is desired. The amounts of the reagents to be employed are not critical, some of the desired product being obtained when employing any proportions of the reactants. However, the reaction consumes the reactants in equimolar proportions and such proportions are generally preferred. When HX is a lower alkanol, an excess of about 25–50 molar percent is preferred. The reaction proceeds at a hydrogen chloride or chloride liberating temperature, conveniently at temperatures between 50° and 150° C. and preferably at the boiling temperature. A hydrogen chloride acceptor such as triethylamine, pyridine, potassium carbonate or N,N-dimethylaniline is added to the reaction medium if desired.

In preparing the compounds of this invention in which the HX reactant is a lower alkanol, or phenylthiol, the reactants and reaction medium are contacted in any convenient order. Following the contacting of the reactants, the temperature of the reaction mixture is maintained within the reaction temperature range for a short period of time. After the reaction period, the desired product can be separated and collected by conventional procedures such as crystallization and decantation or filtration. The new phenoxaphosphinic acid derivatives thus isolated can be employed in pesticidal applications or further purified by conventional procedures such as washing and crystallization before being so employed.

DESCRIPTION OF THE PREFERRED EMBODIMENTS

The following examples describe completely representative specific embodiments and the best modes contemplated by the inventor for carrying out the invention.

EXAMPLE 1

2,8-dimethyl-10-methoxyphenoxaphosphine 10-oxide

A solution of 6.0 g. of 2,8-dimethylphenoxaphosphinyl chloride in 50 ml. of methanol was refluxed for one hour, then evaporated to dryness. The solid residue was dissolved in a minimum of chloroform, filtered to remove a small amount of insoluble impurities, and the chloroform solution evaporated to dryness. The residue was recrystallized from 400 ml. of cyclohexane to give the title compound as colorless crystals, melting at 177°–180° C.

Analysis.—Calcd. for C$_{15}$H$_{15}$O$_3$P (percent): C, 65.7; H, 5.52; P, 11.3. Found (percent): C, 65.5; H, 5.50; P, 11.14.

EXAMPLE 2

10-allylamino-2,8-dimethylphenoxaphosphine 10-oxide

To a stirred partial solution of 5.58 g. (0.02 mole) of 2,8-dimethylphenoxaphosphinyl chloride in 75 ml. of 1,2-dimethoxyethane was added rapidly a solution of 1.14 g. (0.02 mole) of allylamine and 2.29 (0.022 mole) of triethylamine in 40 ml. of 1,2-dimethoxyethane. The addition was carried out at room temperature and was complete in 10 minutes. The resulting mixture, containing a white precipitate, was then warmed slightly and filtered. The residual salt was washed well with several portions of warm 1,2-dimethoxyethane. The residue on evaporation of the 1,2-dimethoxyethane liquors was recrystallized from 100 ml. of the same solvent to give the title compound as nearly colorless crystals, melting at 135°–138° C. A sample recrystallized once again melting at 136°–139° C.

The procedure is repeated with the substitution of phenylthiol in place of allylamine to give the corresponding 10-phenylthio-derivative.

EXAMPLE 3

2,8-dimethoxy-10-phenylthiophenoxaphosphine 10-oxide

A stirred partial solution of 3.11 (0.01 mole) of 2,8-dimethoxyphenoxaphosphinyl chloride in 50 ml. of toluene was treated with 1.10 g. (0.01 mole) of thiophenol in 50 ml. of toluene at room temperature. Subsequently, the reaction mixture was heated at reflux for a period of one hour, filtered hot and allowed to cool to room temperature. The product separated as colorless crystalline $C_{20}H_{17}O_4PS$, having a molecular weight of 384.38.

A substitution of 2,8-dibromophenoxaphosphinyl chloride for the 2,8-dichloro reagent gives the corresponding 2,8-dibromo compound.

The following compounds of the present invention are prepared following procedures described above.

2,8-dimethyl-10-(phenylthio)phenoxaphosphine 10-oxide (melting at 120°–122.5° C.) by reacting together 2,8-dimethylphenoxaphosphinyl chloride and thiophenol.

2,8-di-n-butyl-10-(phenylthio)phenoxaphosphine 10-oxide (molecular weight 436.53) by reacting together 2,8-(di-n-butyl)phenoxaphosphinyl chloride and thiophenol.

2,8-di-n-propoxy - 10 - (phenylthio)phenoxaphosphine 10-oxide (molecular weight 440.48) by reacting together 2,8-di-n-propoxyphenoxaphosphinyl chloride and thiophenol.

2,8 - dichloro-10-(phenylthio)phenoxaphosphine 10-oxide (molecular weight 393.22) by reacting together 2,8-dichlorophenoxaphosphinyl chloride and thiophenol.

2,8-di-n-propyl-10-n-propoxyphenoxaphosphine 10-oxide (molecular weight 358.41) by reacting together 2,8-di-n-propylphenoxaphosphinyl chloride and n-propanol.

2,8-dichloro-10-ethoxyphenoxaphosphine 10-oxide (molecular weight 329.12) by reacting together, 2,8-dichlorophenoxaphosphinyl chloride and ethanol.

The compounds of the present invention or compositions containing the same are useful as pesticides. For the control of insect and plant pests including bacteria and fungi, the compounds or compositions containing them can be applied to pests and their habitats in pesticidal amounts to obtain adequate controls and kills. Such pests can be controlled as the two-spotted spider mite, American cockroach, alfalfa, lettuce downy mildew, tomato late blight, acid fast bacterium, fungus *Rhizoctonia solani, Trichophyton mentagrophytes, Staphylococcus aureus* and *Bacillus subtilis.* This is not to imply that all of the compounds herein are equally effective against the same organisms or at the same concentrations.

The compounds conveniently can be employed in liquid or dust compositions. In such usage, the compounds are modified with one or a plurality of adjuvants or helpers including water, organic solvents, petroleum oils, petroleum distillates, naphthas, or other liquid carriers, surface active dispersing agents and finely divided solids such as chalk, talc or bentonite. Depending upon the concentration of the toxicant compounds in such formulations, the augmented compositions are adapted to be distributed on plants or plant parts, or in soil, inks, adhesives, cutting oils, paints, textiles, paper, lumber, white or cooling waters, or to be employed as concentrates and subsequently diluted with additional liquid or solid adjuvants to produce the ultimate treating compositions. The toxicant compounds of the present invention and the compositions containing these compounds are introduced into the various environments by such conventional techniques as spraying, dusting, drenching, and plowing into the soil.

The exact concentration of the novel compounds to be employed in the treating compositions is not critical and may vary considerably provided the required amount of effective agent is supplied on the plant or plant part, in the soil, ink, adhesive, cutting oil, textile, paper, wood and so forth. The concentration of toxicant in liquid compositions generally is from about 0.05 to 50 percent by weight. Concentrations up to 95 percent by weight oftentimes are conveniently employed. In dusts, the concentration of the toxicant can be from about 0.05 to 10 percent by weight. In compositions to be employed as concentrates, the toxicant can be present in a concentration of from 5 to 98 percent by weight.

In operations against soil dwelling pests such as soil fungi and bacteria, the compounds of the present invention are effective in the killing of such organisms at concentrations of 500 parts per million by weight of soil. When employed as the active constituent against bacterial and fungal diseases of plants, the compounds are effective at concentrations of 1500 parts per million by weight. In other operations, the compounds of the present invention are effective in preventing the microbial degradation of wood when the wood is impregnated with liquid compositions containing the toxic compounds of this invention at concentrations of 10,000 parts per million by weight. In addition, the compounds of the present invention are useful for the control of terrestrial plants when employed at application rates of 100 pounds per acre. In still further operations, the compounds of the present invention are employed in paints, cutting oils white or cooling waters, casein suspensions or adhesives at a concentration of at least 1500 parts per million by weight to achieve kill and control of fungi and bacteria which cause microbiological degradation of these products.

In further operations, 2,8-dimethyl-10-(phenylthio)phenoxaphosphine 10-oxide gives complete control of acid fast bacterium and fungus *Rhizoctonia solani* when the compound is employed in aqueous compositions at a concentration of 500 parts per million both as bactericide and as fungicide.

In still further operations, 2,8-dimethyl-10-methoxyphenoxaphosphine 10-oxide and 2,8-dimethyl-10-(phenylthio)phenoxaphosphine 10-oxide give complete control of *Trichophyton mentagrophytes* when the compound is employed in aqueous composition at a concentration of 1500 parts per million.

The 2,8-disubstituted phenoxaphosphinyl chlorides required as starting materials for these reactions are prepared by reacting one of the corresponding 2,8-disubstituted phenoxaphosphinic acids with thionyl chloride wherein a chlorogroup replaces the acidic hydroxyl group in a conventional manner. The procedure for the synthesis of the phosphinic acids is based on that described by L. D. Freedman, G. O. Doak and J. R. Edmisten, J. Org. Chem. 26, 284 (1961) for the preparation of 2,8-dimethylphenoxaphosphinic acid, in which di-p-tolyl ether is reacted with phosphorus trichloride in the presence of aluminum chloride and the reaction mixture is hydrolyzed. In place of di-p-tolyl ether, the corresponding di-p-(lower alkyl)phenyl ether, the di-p-halophenyl ether or the di-p-(lower alkoxy)phenyl ether is substituted to give the other 2,8-(disubstituted)phenoxaphosphinic acids which are in turn reacted with thionyl chloride to give the phenoxaphosphinyl chloride starting materials.

What is claimed is:

1. A phenoxaphosphinate corresponding to the formula

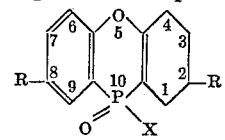

wherein R represents chloro, bromo, lower alkyl or lower alkoxy and X represents lower alkoxy, or phenylthio.

2. The compound of claim 1 wherein R represents methyl and X represents methoxy or phenylthio.

3. The compound of claim 1 wherein R represents methyl and X represents phenylthio.

References Cited

UNITED STATES PATENTS 2,865,948  12/1958  Fusco _____ 260—461

OTHER REFERENCES

Granoth et al.: Israel J. of Chemistry, vol. 6, pages 651–57 (1968). Printed in September.

I. G. Campbell: J. Chem. Soc. (6) (1968), pages 3026–3028. Precise date unknown.

ALEX MAZEL, Primary Examiner

J. TOVAR, Assistant Examiner